United States Patent Office 2,914,050
Patented Nov. 24, 1959

2,914,050

ENGINE FUEL CONTROL UTILIZING COMPRESSOR PRESSURE, SPEED AND TEMPERATURE

Ferdinando Carlo Reggio, Tampa, Fla.

Application September 21, 1953, Serial No. 381,247, which is a division of application Serial No. 496,296, July 27, 1943, which is in turn a continuation of application Serial No. 254,355, February 3, 1939. Divided and this application June 2, 1958, Serial No. 739,041

17 Claims. (Cl. 123—103)

This invention relates to liquid fuel control systems and more particularly to liquid fuel metering or regulating systems for combustion engines, this application being a division of my application Serial No. 381,247, filed September 21, 1953, which in turn is a division of Serial No. 496,296, filed July 27, 1943, and now abandoned, and which in turn is a continuation of Serial No. 254,355, filed February 3, 1939, and also now abandoned.

This invention is of particular significance in connection with aircraft propulsion powerplants which present complex control problems due to the wide range of variations in operating conditions to which they are subject, such as ambient atmospheric pressure, temperature, speed and load.

An object of my invention is to provide a control device for automatically varying the rate of liquid fuel flow in the powerplant in response to changes in a combination of various operating conditions.

It is a further object of this invention to provide a fuel control utilising engine speed, temperature and compressor pressure as parameters of engine operation for controlling the flow of fuel.

Another object is to provide a control device for combustion powerplant which automatically varies the rate of liquid fuel flow to secure optimum ratio between fuel flow and air flow under varying operating conditions and maintain the temperature level of the powerplant within safe limits.

It is a further object of this invention to provide a fuel control which is readily adaptable for control of different types of combustion engines or powerplants with only minor and routine modifications, adaptations and adjustment of the system.

The above and other objects of the invention will be apparent as the description proceeds; and while I have illustrated and described the preferred embodiments of the invention as they now appear to me, it will be understood that such changes may be made as fall within the scope of the appended claims. In the following description and in the claims various details will be identified by specific names for convenience, but they are intended to be as generic in the application as the art will permit.

Figure 1:
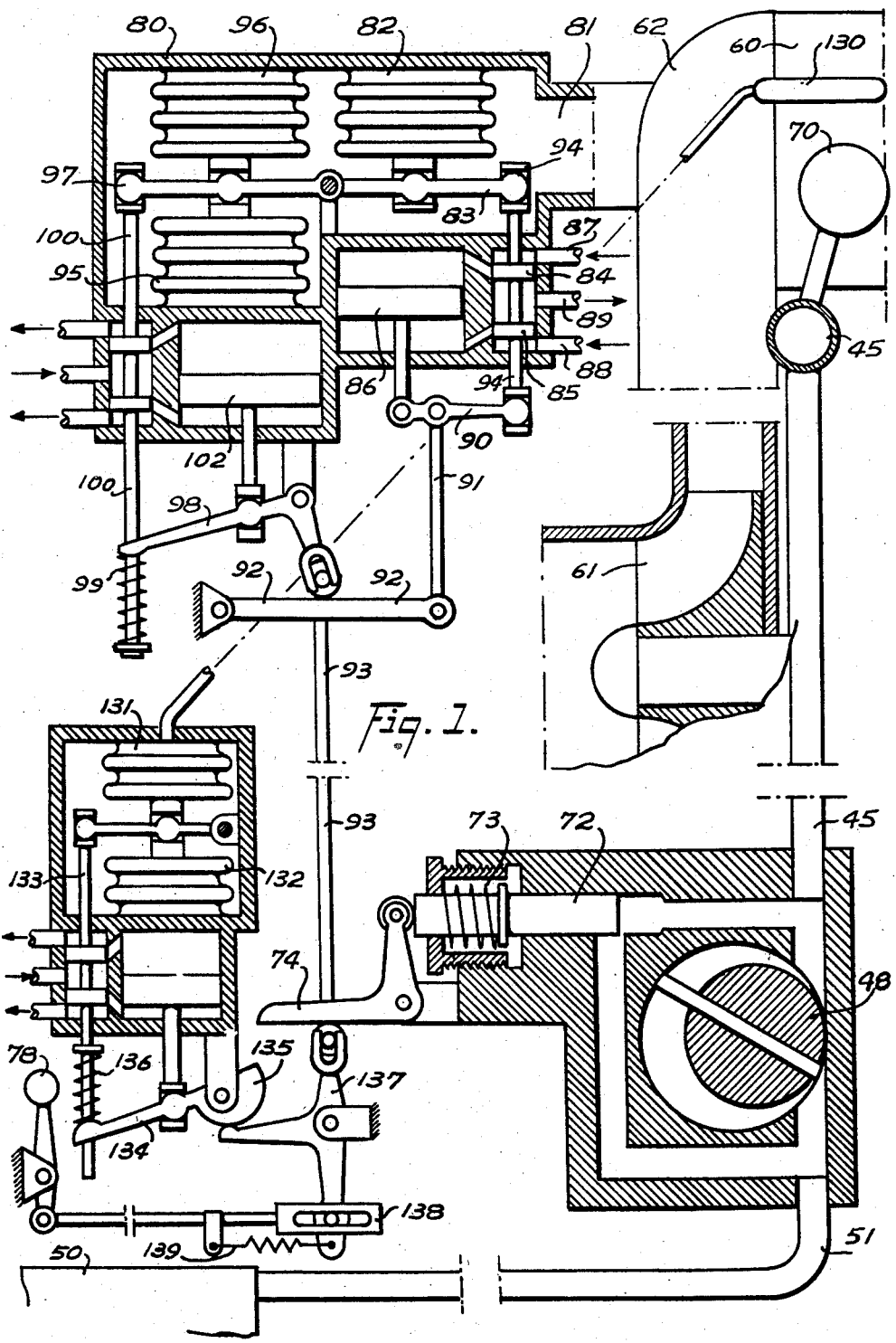
Figure 2:
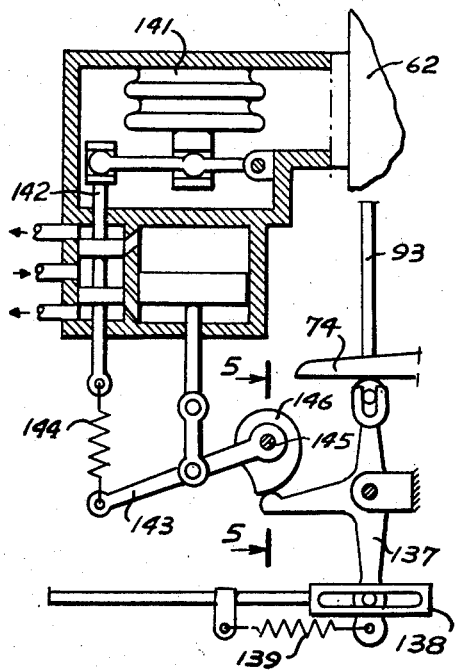
Figure 4:
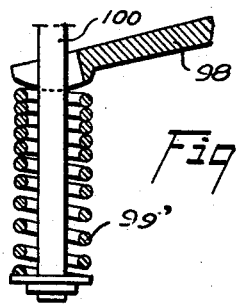
Figure 3:
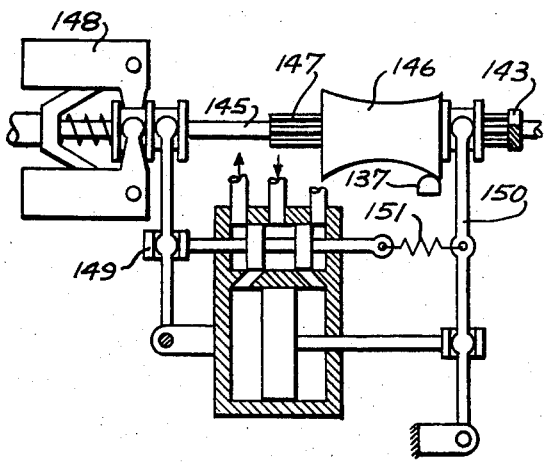

In the drawings, Figure 1 is a sectional elevation of a fuel flow control system according to the invention, Figure 2 shows a component responsive to variations of pressure and if desired also responsive to changes of temperature in the compressor section of the powerplant, Figure 3, in part a section along line 5—5 of Figure 2, indicates a speed-responsive component, and Figure 4 indicates a modified form of the spring 99 of Figure 1.

As indicated in Figure 1, a fuel pump 48 is connected by a low-pressure line 51 to receive fuel from a tank 50, and discharge pressure fuel into a fuel manifold 45 leading to injection units or nozzles 70 through which fuel is sprayed into the combustion chamber or other suitable portion of the powerplant at a rate which varies with the fuel pressure. The injection units or nozzles 70 are no part of the present invention. One form thereof is described in my said parent application Serial No. 496,296. Another suitable type, well known in the art, consists essentially of a calibrated orifice through which a continuous spray of fuel is discharged into the air stream or othere place of utilization of the engine.

The discharge and inlet ports of the fuel pump 48 are connected through a by-pass conduit controlled by a valve having a slidable element 72 biased toward closed position by a spring 73 and actuated by means of a bell-crank lever 74. The capacity of the pump 48 is substantially larger than the maximum fuel requirements of the powerplant, hence excess fuel is constantly flowing through the by-pass, and the fuel pressure in the manifold 45 may be controlled at will by variably positioning the valve 72. The fuel pump 48 may be driven as usual from the powerplant or engine, which is provided with an air compressor or blower 61 supplying air for combustion through a conduit or induction system 62 to one or more cylinders or combustion chambers 60. A housing 80 communicates through a large duct 81 with the air conduit 62 and contains air at compressor discharge pressure and temperature. An evacuated resilient bellows 82 in said housing acts on a lever 83 to operate a pilot valve having discs 84 and 85 which control admission of oil under pressure, through lines 87 and 88 connected to a high pressure system, to either side of piston 86, while a low-pressure line 89 is arranged to drain oil back to the sump. A floating or follow-up lever 90 is connected at its opposite ends with the pilot valve and with the piston 86, respectively, and at an intermediate point with a rod 91 connected through a variable-ratio lever mechanism 92 and a rod 93 with the bell-crank lever 74 which controls the fuel regulating valve 72.

Also included within the housing 80 there is a resilient bellows 95 which contains a definite weight of gas or other thermally expansible fluid, normally held at constant volume. The housing 80 is preferably heat-insulated, and since it is connected to the induction system 62 by means of a short conduit 81 of large diameter, eddy currents and tubulence set up by the high-velocity air flow produce an active thermal exchange, by conduction and convection, which maintains the fluid within the bellows at the same temperature as in the induction system 62. The absolute pressure in the bellows is therefore proportional to the absolute air induction temperature. The bellows 95 and a geometrically similar but evacuated bellows 96 act against each other and on a lever 97 to operate the rod 100 of a pilot valve controlling a servo mechanism 102 similar to the servo motor 86 already described in detail. Hydraulic medium is led thereto under pressure and drained therefrom as indicated by the arrows. The pressure of the air within the housing 80 acts in opposite directions on the bellows 95 and 96 thereby balancing out the effect of any change of such pressure, so that the load transmitted to the lever 97 is only dependent upon the induction temperature. The servo piston 102 operates on a lever 98 to vary the distance of the upper end of rod 93 from the fulcrum of lever 92. A follow-up spring 99 connecting the lever 98 with the pilot valve 100 balances the load transmitted by the bellows assembly 95—96 to the pilot valve and is so designed that the operating distance of rod 93 from the fulcrum of lever 92 is maintained proportional to the actual absolute induction temperature. Any change in said temperature actuates the bellows 95 and the servo mechanism 102 to rotate the lever 98 and vary the load of spring 99 until the balance of rod 100 of the pilot valve in its neutral position is restored.

The lower end of the rod 93 is provided (like the upper end thereof) with a roller, and engages the horizontal arm of the bell-crank lever 74. A lever 137 has an upper arm which is connected with the rod 93 and is arranged to vary the effective distance of the rod 93 from the fulcrum of lever 74 so as to alter the effective ratio of the bell-crank lever. The device operates as follows: the evacuated resilient bellows 82 exerts on the pilot valve 94 an upward load which is proportional to the air induction pressure. In normal operation the pilot valve 94 is maintained in equilibrium in its neutral position by a downward load of equal magnitude exerted thereon through the various elements 90—93 and 74 by the fuel pressure applied to the inner end of the regulator valve 72. Thus, for a given adjustment of levers 98 and 137, the air induction pressure (which is a measure of powerplant air flow) and the fuel pressure in the fuel manifold 45 (which is a measure of powerplant fuel flow) are proportional. Thus, if the pressure of the air in the induction system 62 decreases, due for example to climbing of the aircraft to higher altitude, the bellows 82 expands and the pilot valve 94 moves downward, draining pressure oil from the lower chamber of cylinder 86 and admitting pressure oil to the upper chamber thereof. As a result, the power piston 86 moves downward, causing, through elements 90—93, counter-clockwise rotation of the bell-crank lever 74 and outward motion of the valve 72 to increase the flow of by-passed fuel. Hence the rate of powerplant fuel flow decreases, and so does the pressure in the fuel manifold 45, thus decreasing the fuel pressure load exerted upon the inner end of the valve 72 and in turn the magnitude of the downward load transmitted from the valve 72 to the pilot valve 94 in proportion to the decrease of induction air pressure, whereupon the pilot valve 94 returns to neutral position and stops the hydraulic cylinder piston 86. Conversely, an increase of induction air pressure, due for example to a descent of the aircraft to lower altitude, causes the same device to increase the fuel pressure in manifold 45 so as to increase the rate of powerplant fuel flow in the desired relation to increasing powerplant air flow.

As already stated, the lever 97 actuated by the bellows assembly 95—96 exerts upon the pilot valve 100 of the servo-motor 102 an upward load which is proportional to the induction air temperature. In normal operation, that is, under steady temperature conditions, said load is balanced by the biasing effect of the compression spring 99, and the pilot valve 100 is in neutral position. An increase of induction temperature causes a proportional increase of pressure within bellows 95 and also in the upward load applied to the pilot valve 100. Hence bellows 95 expands, the companion bellows 96 contracts, and the pilot valve 100 is lifted to a position in which the elastic reaction due to the resilient deformation of the bellows balances the difference between the upward load transmitted to the pilot valve 100 due to the fluid pressure within bellows 95 and the load of spring 99. Oil under pressure is admitted above the piston 102 of the servo-motor so as to actuate the piston and rotate the lever 98 counterclockwise, thereby increasing the load of the compression spring 99 by an amount proportional to the increased induction temperature, whereupon the pilot valve 100 returns to neutral position and stops the piston 102. The lever 98 has a lower arm which is connected to the upper end of the rod 93 and is arranged to vary the distance of the rod 93 from the fulcrum of lever 92 in proportion to the variations of temperature in the air induction system 62. Thus the upward load applied by lever 92 to the rod 93 is maintained directly proportional to the absolute pressure and inversely proportional to the absolute temperature in the induction system 62, and is therefore proportional to the air density therein. Hence, for a given position of lever 137, the structure so far described operates to maintain the pressure in the fuel manifold 45 at all times proportional to the air induction density.

In certain engine applications it may be desirable to vary the rate of fuel flow as a different function of air temperature, for instance in inverse proportion to the square root of such temperature. Various characteristics may be obtained by using springs 99 of different designs. As indicated at Figure 4, the spring 99' may be formed with uniform coil diameter and variable pitch such that within the operating range the number of free coils is inversely proportional to the spring deflection, thus causing the fuel pressure to vary in inverse proportion to the square root of the air temperature. If, on the other hand, it is preferred to use a conventional spring 99, any desired relationship between the angular position of lever 98 and the corresponding distance of rod 93 from the fulcrum of lever 92 may be obtained by resorting to a cam mechanism arranged substantially as indicated in connection with Figures 2 or 3.

The lower arm of lever 137 is connected through a lost motion device such as a pin engaging an elongated slot 138 formed at one end of a rod actuated by a pilot's lever 78. A tension spring 139 exerts a biasing load on the lever 137 tending to rotate the same clockwise. By operation of the manual lever 78 the pilot or operator may rotate the lever 137 so as to vary the distance of rod 93 from the fulcrum of the bell-crank lever 74 thereby controlling the ratio between fuel flow and air flow. However, such arrangement, in which the adjustment of the fuel-air ratio of the combustible mixture is left to the arbitrary choice of the pilot or engineer is not the best suitable in connection with aircraft propulsion powerplants. Accordingly, one of the objects of the invention is to provide, in combination with the previously disclosed arrangements, means responsive to one or more engine operative conditions, such as the air pressure or density in the induction manifold, the engine speed, the engine cylinder temperature, whereby the adjustment of the mixture control lever 137, and in turn the fuel-air ratio, may be automatically controlled and vary as a predetermined function of said operating condition or conditions. Operation of the engine with "best economy" mixture is possible over a certain range of power, beyond which the engine cannot safely be operated without resorting to some additional enrichment of the mixture to suppress over-heating and detonation. A temperature responsive element 130, mounted in suitable location such as on a cylinder head or near an exhaust port, is connected with a bellows 131 placed to act against an evacuated bellows 132 so that changes in the pressure surrounding the bellows act in opposite directions thereon and have no effect on their operation. Temperature changes about element 130 operate the bellows 131 and in turn the pilot valve 133 of a servo mechanism similar to those already described in detail to control the angular adjustment of lever 134, of cam 135 and to vary the load of the spring 136 acting on the pilot valve 133. An increase in temperature of the element 130 lowers the pilot valve 133 and in turn rotates the lever 134 clockwise thereby increasing the load of spring 136 until the balance of the pilot valve 133 in its neutral position is restored. The cam 135 is adapted to operate the lever 137 so that for each temperature of the element 130 it determines a corresponding predetermined minimum possible value of the fuel-air ratio. Because of the lost motion connection provided by the elongated slot 138, the temperature control device 130—136 permits manual variation of the rate of fuel flow by means of the pilot's lever 78 up to a predetermined operating temperature of the powerplant but is arranged to over-ride said lever 78 and take over control of the lever 137 at temperatures above that value in order to prevent excessive over-heating of the powerplant. Evidently, the point at which the temperature control device takes over control is dependent upon the setting of the manual lever 78.

The rotatable cam actuating the horizontal arm of lever 137 may be provided with a warped or double-curvature surface, and an additional mechanism, such as indicated in Figure 3, may be used in order to vary the axial position of the cam. Such as arrangement makes it possible to alter the rate of fuel flow automatically as any desired function of two independent variables or parameters or operating conditions of the powerplant, said function being determined by the configuration of the three-dimensional cam. Figure 2 shows a rotatable cam 146 which, like the cam 135 of Figure 1, is adapted to engage the horizontal arm of lever 137 through a lost-motion connection. A bellows 141, evacuated totally or in part and enclosed in a housing communicating with the engine air induction system 162 on the discharge side of the compressor 61, operates a pilot valve 142 of a servo mechanism similar to those already described, whereby an increase in compressor pressure raises the pilot valve 142 and causes counter-clockwise rotation of lever 143 until the increasing load of the tension spring 144 restores the balance of the pilot valve 142 in its neutral position. Angular positioning of the cam from the lever 143 may be obtained by securing the latter to an externally splined sleeve 147 rotatably mounted on an engine driven shaft 145. The cam 146, which has a three-dimensional surface, is slidably mounted upon the splines of the sleeve 147, so that the angular setting of the cam is determined by means of the lever 143 in accordance with air induction or compressor pressure, while the axial adjustment thereof is determined by speed responsive means such as a governor 148 driven from the engine or power-plant through a shaft 145. The governor 148 controls the pilot valve 149 of a servo mechanism whereby an increase in engine speed displaces the pilot valve to the left and causes the lever 150 to rotate clockwise until the increasing load of the tension spring 151 returns the pilot valve 149 to its neutral position. The cam 146 therefore determines for each value of induction pressure and speed conditions a corresponding predetermined or minimum value of the fuel-air ratio. In the preferred embodiment the cam configuration is such that in the cruising range of induction pressure and engine speed combinations such minimum value corresponds substantially to the "best economy" mixture, while for combinations of engine speed and induction pressure corresponding to higher power output the minimum fuel-air ratio obtainable will be higher than that corresponding to "best economy" mixture. Due to the lost motion connection provided by the elongated slot 138 and spring 139, the cam is adapted to over-ride the manual lever 78 and take over control of the lever 137 under predetermined speed and pressure conditions of the powerplant. The particular point at which control of lever 137 shifts from manual to automatic evidently depends upon the setting of the pilot's lever 78. And where the bellows 141 is not entirely evacuated but contains fluid, it will be actuated in response to variations not only in the induction air pressure but also in response to induction air temperature changes.

Obviously, the structure disclosed in connection with Figure 3 including the speed governor 148 for axially shifting the cam 146 of Figures 3 and 2 may also be employed to shift axially the cam 135 of Figure 1. It is clear from the foregoing that the manual control 78, the speed control 148, and the temperature and/or pressure controls 130 or 141 may be inoperative under particular operating conditions; but the altitude control including the bellows 82 actuated in response to variations in compressor pressure is effective at all times to actuate the fuel control valve 72 in predetermined coordination with the other control devices.

It will be appreciated from the foregoing that the fuel metering or control system above described actuates the fuel valve 72 to vary the rate of fuel flow as the product of two independent factors, or as a function of two independent variables, represented by the pull on the rod 93 and by the effective ratio of the lever 74. The system includes four main control components: an altitude control 80 as indicated in Figure 1; a manual control 78; a temperature (or pressure) control 130 or 141; and a speed control 148. Moreover, in the preferred embodiment disclosed herein the altitude control is constantly operating upon the rod 93, hence it determines at all times one of the factors of fuel flow, while the other factor (the ratio of lever 74) is determined either by the manual control, or by the temperature (or pressure) control, or by the speed control. And a lost-motion connection is provided whereby the manual control may be over-ridden by the temperature control and by the speed control, when predetermined values of temperature and speed conditions are reached. It will be further noted that the variable-ratio lever mechanism comprising the levers 74 and 92 and the movable pivots connected therewith operate as a multiplying device to which various signals are fed or transmitted in response to certain parameters of engine operation such as pressure, temperature, engine speed and the setting of the control lever 78 for the purpose of positioning the fuel control valve 72.

The foregoing embodiments of the invention have been described for purpose of illustration and not as a limitation of the scope of the invention. It is to be expressly understood that the invention may be practiced in connection with various types of combustion engines or thermal powerplant having different characteristics and distinct operational requirements and limitations, and that various modifications may be made to suit said different requirements, as will be obvious to those skilled in the art without departing from the limits or scope of the invention as defined in the following claims.

Where the claims are directed to less than all of the elements of the complete system disclosed, they are intended to cover possible uses of the recited elements in installations which may not include the non-recited elements.

I claim:

1. In a fuel control for an engine having a compressor, a combustion chamber, a source of fuel under pressure and means for injecting fuel into said combustion chamber including conduit means connected with said source and said combustion chamber, a control valve in said conduit means movable to regulate the rate of fuel flow to said combustion chamber, a first means movable in response to compressor pressure, a second means movable in response to a manually operable control member, means operatively connected to said control valve and said first and second means for multiplying the movements of said first and second means and actuating said control valve, and means responsive to speed and another parameter of engine operation and operatively connected to said valve for limiting the range of operation thereof.

2. In a fuel control for an engine having a compressor and a combustion chamber, a source of fuel under pressure, means for injecting fuel into said combustion chamber including conduit means connecting said source and said combustion chamber, a control valve in said conduit means movable to vary the rate of fuel flow to said combustion chamber, a first means movable in response to compressor pressure, a second movable means subject to manual supervision, means operatively connected to said control valve for multiplying the movements of said first and second means and varying the adjustment of said control valve in proportion to the product of said movements, and means including servo devices responsive to compressor temperature and another parameter of engine operation in mixed relation and operatively connected to said multiplying means for limiting the range of operation of said control valve in proportion to compressor pressure.

3. In a fuel control for an engine having a compressor and a combustion chamber, a source of fuel under pressure, means for injecting fuel into said combustion chamber including conduit means connecting said source and said combustion chamber, a metering orifice in said conduit means, a control valve movable to vary the effective flow area of said orifice and change the rate of fuel flow to the combustion chamber, a first means movable in response to compressor pressure, a second movable means subject to manual supervision, means operatively connected to said control valve for multiplying the movements of said first and second means and actuating said valve to vary the rate of fuel flow in proportion to the product of said movements, and additional means including a three dimensional cam movable in one direction in response to engine speed and in another direction in response to compressor temperature and operatively connected to said multiplying means to provide a controlling signal for limiting the operating range of said control valve.

4. In a fuel control for an engine having a compressor and a combustion chamber, a source of fuel under pressure, means for injecting fuel into said combustion chamber including conduit means connected with said source and said combustion chamber, a valve in said conduit means movable to vary the rate of fuel flow to the combustion chamber, a multiplying device operatively connected to said valve for adjusting the same to control the rate of fuel flow, means movable in response to compressor pressure operatively connected to said multiplying device for feeding thereto a signal to be multiplied, means subject to manual supervision for modifying the output of said multiplying device, and means responsive to at least two parameters of engine operation and operatively connected to said valve for limiting the range of operation thereof.

5. In a fuel control for an engine having a compressor and a combustion chamber, a source of fuel under pressure, means for delivering fuel from said source to said combustion chamber including a fuel valve, a multiplying device operatively connected to said valve for positioning the same and metering the fuel flow, means responsive to compressor pressure for transmitting a first signal to be multiplied to said multiplying device including operative connections thereto, means responsive to a manually adjustable control member and the temperature at a predetermined point in the engine for transmitting additional signals to be multiplied to said multiplying device including operative connections thereto, and means responsive to a function of speed and temperature at a predetermined point in the engine for maintaining the fuel-air mixture ratio within preselected limits.

6. In a fuel control for an engine having a compressor and a combustion chamber, a source of fuel under pressure, means for delivering fuel from said source to said combustion chamber including a fuel valve, a multiplying device operatively connected to said valve for positioning the same and metering in fuel flow, means responsive to compressor pressure for transmitting a first signal to be multiplied to said multiplying device including operative connections thereto, means responsive to a manually adjustable control member and means responsive to the temperature at a predetermined point in the engine for transmitting additional signals to be multiplied to said multiplying device including operative connections thereto, and means responsive to a function of speed and temperature at a predetermined point in the engine operatively connected to said multiplying device for transmitting still further signals thereto and including mechanism for disabling the said means responsive to the manually adjustable control member.

7. In a fuel control for an engine having a compressor and a combustion chamber, a source of fuel under pressure, means for delivering fuel from said source to said combustion chamber including a fuel valve, a multiplying device operatively connected to said valve for positioning the valve and metering the fuel flow, means responsive to compressor pressure for transmitting a first signal to be multiplied to said multiplying device including operative connections thereto, means responsive to manual supervision for transmitting a second signal to be multiplied to said multiplying device including operative connections thereto, and means for limiting the range of variation of the fuel-air mixture ratio comprising means for modifying said second signal, said last mentioned means including mechanism responsive to a function of speed of the engine and temperature at a selected point in the engine.

8. In a fuel control for an engine having a compressor and a combustion chamber, a source of fuel under pressure, means for delivering fuel from said source to said combustion chamber including a fuel valve, a multiplying device operatively connected to said valve for positioning the valve and metering the fuel flow, means responsive to compressor pressure, a servomotor operatively connected to said device for feeding thereto a signal to be multiplied, said servomotor including a pilot valve controlled by movement of said compressor pressure responsive means, means subject to manual supervision operatively connected to said multiplying device for feeding thereto a signal to be multiplied, means movable in response to the speed of rotation of said engine, means movable in response to the temperature at a preselected point in said engine, means for mixing the movements of said speed and temperature responsive means for producing a resultant signal, and an operative connection for receiving said resultant signal and limiting the effect of said manually supervised means upon the multiplying device.

9. In a fuel control for an engine comprising a compressor and a combustion chamber, a source of fuel under pressure, means for injecting fuel into said combustion chamber including conduit means between said source and said combustion chamber, a control valve associated with said conduit means and movable to vary the flow of fuel supplied to said combustion chamber, a multiplying device operatively connected to said control valve for varying the opening thereof, first means movable in response to compressor pressure operatively connected to said multiplying device for feeding thereto a signal to be multiplied, second means movable in response to a parameter of engine operation, a servomotor operatively connected to said device for feeding thereto a signal to be multiplied, said servomotor including a pilot valve controlled by movements of said second means, adjustable means for varying the effect of said second means and modifying the output of said multiplying device, a came movable in linear directions and transversely of said linear directions, a means movable in response to the speed of rotation of said engine including a servo system for moving said cam in one of said directions, means responsive to the temperature at a preselected point in said engine including a servo system for moving said cam in another of said directions, the motions of said cam producing a resultant signal, and a cam follower mechanism receiving said resultant signal and operatively connected to said multiplying device for limiting the effect of said adjustable means on said control valve.

10. In a fuel control for an engine comprising a compressor and a combustion chamber, a source of fuel under pressure, means for injecting fuel into said combustion chamber including a control valve movable to vary the rate of fuel flow to said combustion chamber, a multiplying device operatively connected to said control valve for varying the opening thereof, first means movable in response to compressor pressure operatively connected to said multiplying device for feeding thereto a signal to be multiplied, second means subject to manual supervision for modifying the output of said multiplying device, a cam movable in linear directions and transversely of said linear directions, a means movable in response to engine speed including a servo system for moving said cam in one of said direction, means operatively connecting said cam to said speed responsive means for varying the response thereof upon repositioning of said cam in its motion in said one direction, means responsive to another parameter of engine operation for moving said cam in another of said directions, the motions of said cam producing a resultant signal, and a cam follower mechanism receiving said resultant signal and operatively connected to said second means for overriding the same and limiting the operating range of said control valve.

11. In a fuel control for an engine comprising a compressor and a combustion chamber, a source of fuel under pressure, means for injecting fuel into said combustion chamber including a control valve movable to regulate the rate of fuel flow to said combustion chamber, a multiplying device operatively connected to said control valve for varying the opening thereof, first means movable in response to compressor pressure operatively connected to said multiplying device for feeding thereto a signal to be multiplied, said pressure responsive means including a movable member and a servo mechanism for moving said member in one direction as a linear function of compressor pressure, second control means connected to said device for feeding thereto a signal to be multiplied, a cam movable in linear directions and transversely of said linear directions, engine speed responsive means including a servo system for moving said cam in one of said directions, means responsive to the temperature at a preselected point in the engine for moving said cam in another of said directions, the motions of said cam producing a resultant signal, and a cam follower mechanism operatively connected to said multiplying device for receiving said resultant signal and limiting the signal fed to said device by said second control means.

12. In a fuel control for an engine having a compressor and a combustion chamber, a source of fuel under pressure, means for injecting fuel into said combustion chamber including a control valve movable to regulate the rate of fuel flow to said combustion chamber, a first means movable in response to compressor pressure, a second means movable in response to a parameter of engine operation and a third means subject to manual supervision for producing a plurality of control signals, means operatively connected to said control valve for multiplying said signals and varying the adjustment of said control valve in proportion to the product of said signals, and means including servo devices responsive to compressor temperature and another parameter of engine operation in mixed relation and operatively connected to said multiplying means for altering one at least of said signals and limiting the range of operation of said control valve in proportion to compressor pressure.

13. In a fuel control for an engine having a compressor and a combustion chamber, a source of fuel under pressure, means for injecting fuel into said combustion chamber including a control valve adjustable to vary the flow of fuel to said combustion chamber, a first means movable in response to compressor pressure, a second means movable in response to a parameter of engine operation and a third movable means subject to manual supervision for producing a plurality of control signals, means operatively connected to said control valve for multiplying said signals and actuating said valve to vary the rate of fuel flow in proportion to the product of said signals, and additional means including a three dimensional cam movable in one direction in response to engine speed and in another direction in response to compressor temperature and operatively connected to said multiplying means to provide a controlling signal for overriding one at least of said signals and limiting the range of said control valve.

14. In a fuel control for an engine having a compressor and a combustion chamber, a source of fuel under pressure, means for delivering fuel from said source to said combustion chamber including a fuel control valve, a multiplying device operatively connected to said control valve for positioning the valve and metering the fuel flow; means responsive to compressor pressure, means responsive to a parameter of engine operation and manually operable control means including operative connections to said multiplying device for transmitting a plurality of signals to be multiplied to said multiplying device, and means responsive to a function of speed and temperature at a predetermined point in the engine for altering at least one of said signals.

15. In a fuel control for an engine having an air intake system with a compressor therein and a combustion chamber, a source of fuel under pressure, a valve for controlling the flow of fuel from said source to said combustion chamber, means providing a signal responsive to the discharge pressure of said compressor, means providing a signal responsive to the speed of the engine, means providing a signal responsive to temperature in said air intake system, and means for transmitting said signals to said fuel control valve whereby the fuel flow is regulated as a function of the product of the compressor pressure signal and another of said signals during normal operation, and as a function of the pressure signal multiplied by the combined speed and temperature signals when the fuel-air mixture ratio tends to exceed predetermined limits.

16. In a fuel control for a combustion engine having a compressor, a source of fuel under pressure, orifice means downstream of said source, a fuel valve for controlling said orifice means to regulate the flow of fuel from said source to said engine, a valve-actuating mechanism including first means movable in response to compressor pressure operatively connected to adjust said valve and second movable means operatively connected to adjust said valve for varying the fuel flow substantially in proportion to the product of said compressor pressure and the movement of said second means, a control mechanism subject to manual supervision and operatively connected to said second means for actuating the same, a cam movable in linear directions and transversely of said linear directions, means responsive to the speed of the engine for moving said cam in one of said directions, means responsive to the temperature at a preselected point in said engine for moving said cam in another of said directions, the motions of said cam producing a resultant signal, and means receiving said resultant signal for overriding said manually supervised control mechanism and actuating said second means.

17. In a fuel control for a combustion engine having a compressor, a source of fuel under pressure, an orifice downstream of said source, a fuel valve for controlling said orifice to regulate the flow of fuel to said engine, first means movable in response to compressor pressure operatively connected to said valve to transmit thereto a first control signal and second movable means operatively connected to said valve to transmit thereto a second control signal for metering the flow of fuel to the engine as the product of both of said signals, a control mechanism responsive to a parameter of engine operation for actuating said second means, and means responsive to a function of a plurality of parameters of engine operation for overriding said control mechanism and taking over operation of said second means.

References Cited in the file of this patent

UNITED STATES PATENTS 2,822,666    Best  ----------------  Feb. 11, 1958